United States Patent [19]

Hara et al.

[11] Patent Number: 4,875,231
[45] Date of Patent: Oct. 17, 1989

[54] RADIO TELEPHONE SYSTEM

[75] Inventors: Toshihiro Hara; Akio Yotsutani; Ryoji Kawasaki, all of Tokyo; Kazuyuki Tate, Aichi; Syoji Huse; Koji Ono, both of Tokyo, all of Japan

[73] Assignees: NEC Corporation; Nippon Telegraph & Telephone Corp., both of Tokyo; Kabushiki Kaisha Toshiba, Kanagawa, all of Japan

[21] Appl. No.: 112,928

[22] Filed: Oct. 27, 1987

[30] Foreign Application Priority Data

Oct. 30, 1986 [JP] Japan ................... 61-258748

[51] Int. Cl.⁴ ........................................... H04M 11/00
[52] U.S. Cl. ...................................... 379/61; 379/58; 379/63; 455/34
[58] Field of Search ............... 455/33, 34, 54; 379/58, 379/61-62, 59, 60, 63

[56] References Cited

U.S. PATENT DOCUMENTS

| 4,163,121 | 7/1979 | Yoshikawa et al. | 379/59 |
| 4,672,601 | 6/1987 | Ablay | 379/63 |
| 4,672,658 | 6/1987 | Kavehrad et al. | 379/61 |
| 4,682,367 | 7/1987 | Childress et al. | 455/17 |
| 4,731,812 | 3/1988 | Åkerberg | 379/61 |
| 4,741,019 | 4/1988 | Takahashi | 379/61 |

Primary Examiner—Jin F. Ng
Assistant Examiner—David H. Kim
Attorney, Agent, or Firm—Sughrue, Mion, Zinn, Macpeak & Seas

[57] ABSTRACT

A radio telephone system includes a base station connected to a telephone exchanger and a plurality of mobile stations connected to the base station through a radio channel including a control channel and communication channels. The base station includes a transmitter/receiver, a receiver, and a controller. In a stand-by mode, the controller sets a channel of the transmitter/receiver to the control channel to receive a calling signal from each mobile station and sets a channel of the receiver to a given communication channel to monitor vacancy of the communication channels.

5 Claims, 8 Drawing Sheets

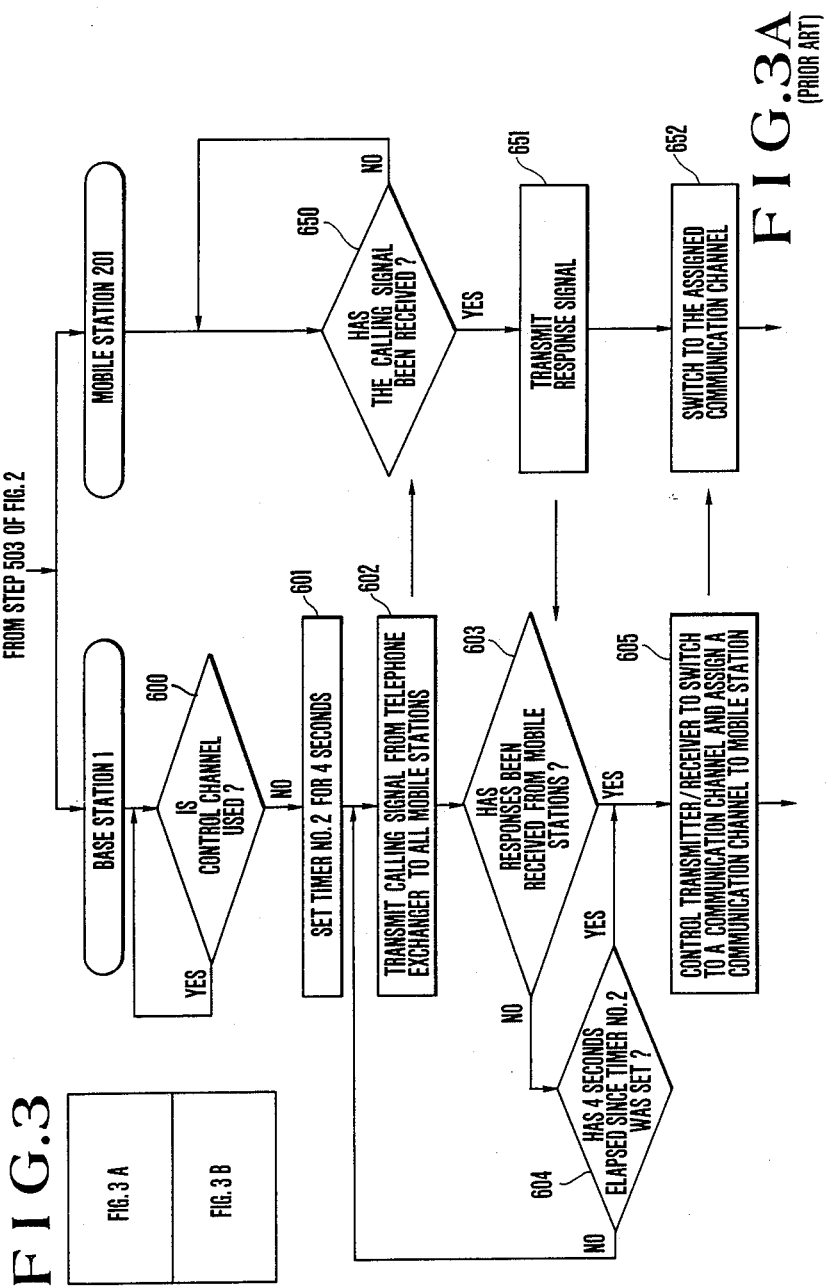

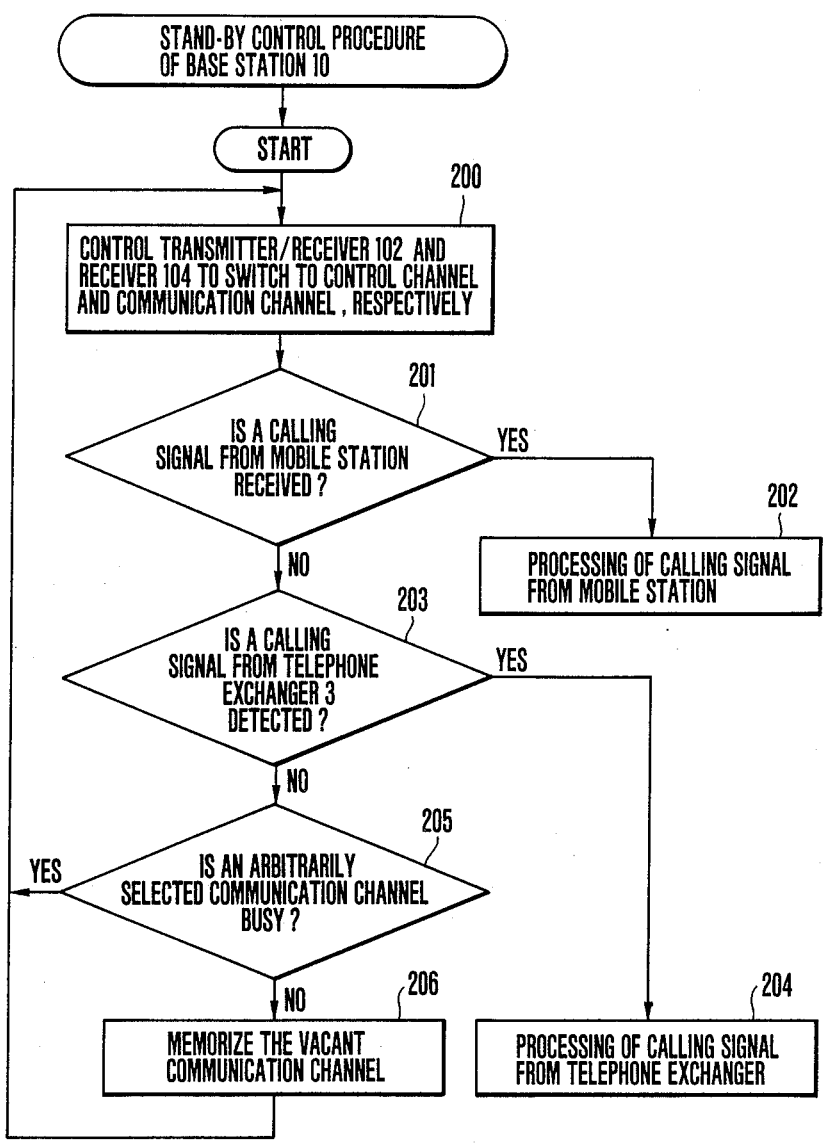
F I G. 5

RADIO TELEPHONE SYSTEM

BACKGROUND OF THE INVENTION

The present invention relates to a radio telephone system and, more particularly, to connection control between a base station and a plurality of mobile stations in the radio telephone system.

As shown in FIG. 1, a conventional radio telephone system comprises a base station 1 connected to a telephone exchanger 3 through a subscriber line 110, and a plurality of mobile stations 201 connected to the base station 1 through a radio channel.

The base station 1 comprises a controller 101 having a microprocessor as a main component, a transmitter/receiver 102 for exchanging signals with the mobile stations 201 through a radio channel, and a hybrid circuit 103 including an interface circuit for interfacing data with the subscriber line 110 and a communication network. The radio channel comprises a control channel and communication channels. The controller 101 has a memory 106 and timers 107 and 108, and controls the transmitter/receiver 102, and the hybrid circuit 103 to control connection and communication between the base station 1 and the mobile stations 201 through a radio channel.

In a multi-access radio telephone system, a plurality of radio telephone sets having a given radio frequency band are simultaneously used in a relatively narrow area. A radio wave emitted from one radio telephone set can reach all other radio telephone sets. The radio telephone sets use common communication channels the number of which is smaller than that of mobile stations (e.g., 3 common channels). When a given radio telephone set is off-hooked using communication channel #1, the remaining radio telephone sets can use one of communication channels #2 and #3 after they check whether the channels #2 and #3 are vacant.

Stand-by and connection control procedures in the conventional radio telephone sets in the multi-access radio telephone system will be described with reference to FIGS. 2 and 3.

FIG. 2 is a flow chart of the stand-by control procedure of the base station 1. Referring to FIG. 2, the controller 101 controls the transmitter/receiver 102 to switch a channel subjected to radio reception to a control channel (step 500). The timer 107 is set for, e.g., one second (step 501). The controller 101 repeatedly checks in step 502 whether a calling signal is received from the mobile station 201 and in step 503 whether a calling signal from the telephone exchanger 3 is detected until the time (one second) set in the timer 107 has elapsed (step 504).

When the calling signal transmitted from the mobile station 201 to the base station 1 (referred to as calling signal from the mobile station) is detected in step 502, the flow advances to processing of the calling signal from the mobile station (a detailed description thereof will be omitted) to connect this mobile station 201 to the telephone exchanger 3 (step 508).

When the calling signal transmitted from the telephone exchanger 3 to the base station 1 (referred to as calling signal from the telephone exchanger) is detected in step 503, processing of the calling signal from the telephone exchanger 3 (step 509) is performed for connecting the called mobile station 201 to the telephone exchanger 3 (this processing will be described in detail later).

When the lapse of one second set in the timer 107 is detected in step 504, the controller 101 controls the transmitter/receiver 102 to switch the radio channel from the control channel to one arbitrary communication channel (step 505). The controller 101 determines in step 506 whether the communication channel is busy. If YES in step 506, the flow returns to step 500. However, if NO in step 506, the communication channel which is not busy is memorized in the memory 106 (step 507). Thereafter, the flow returns to step 500, and the above stand-by control procedure is repeated.

FIGS. 3A and 3B are flow charts of processing of the calling signal from the telephone exchanger 3 (step 509 in FIG. 2). Referring to FIGS. 3A and 3B, in the base station 1 in which the calling signal from the telephone exchanger 3 is detected by forming a current loop with the subscriber line 110, the controller 101 in the base station 1 determines in step 600 whether other radio telephone sets use the control channel. If the control channel is not used, a predetermined time (e.g., 4 seconds) is set in the timer 108 in step 601. The controller 101 transmits the calling signal from the telephone exchanger to all the mobile stations 201 through the control channel (step 602). The controller 101 determines in step 603 whether the responses to the calling signal from the telephone exchanger have been received from the mobile stations 201. When each mobile station 201 detects reception of the calling signal from the telephone exchanger in step 650, the response is transmitted to the base station 1 in step 651. The operation of the base station 1 in step 603 continues until the lapse of four seconds preset in the timer 108 is detected in step 604. When the responses are detected in step 603, or when the lapse of four seconds preset in the timer 108 is detected in step 604, the controller 101 in the base station 1 controls the transmitter/receiver 102 to switch the channel from the control channel to a given communication channel (step 605).

In this case, since a communication channel assignment signal is transmitted from the base station 1 to the mobile stations 201, the channel of each mobile station 201 is switched to the assigned communication channel (step 652).

Subsequently, the base station 1 receives a ringing signal of a 16-Hz intermittent signal from the telephone exchanger 3 and transmits a bell signal through the communication channel as long as the ringing signal is received (steps 606 and 607). The controller 101 then waits for an off-hook signal (step 608).

In each mobile station 201, the bell rings when the bell signal is received (steps 653 to 655), thereby causing a user to off-hook the mobile telephone set (step 656). When the mobile station 201 detects the off-hook state (step 656), the mobile station 201 transmits an off-hook signal to the base station 1 (step 657). The off-hook signal is received by the base station 1 (step 608). Thereafter, exchange of the communication signal using the assigned communication channel is performed between the base station 1 and the mobile station 201.

In the conventional multi-access radio telephone system described above, the following problems are presented.

In the stand-by mode of the base station 1, the controller 101 controls the transmitter/receiver 102 to switch the control and communication channels every predetermined time interval, thereby monitoring reception of the calling signal from the mobile station 201 and monitoring of the vacant communication channel. Therefore, when the calling signal is transmitted from the mobile station 201 to the base station 1 while the base station 1 monitors the vacant communication channel (steps 505 to 507 in FIG. 2), the base station 1 cannot immediately detect the calling signal from the mobile station until the channel is switched to the control channel (steps 500 to 502 in FIG. 2).

Assume that a call is made from the telephone exchanger 3 when one, e.g., 201(A) of the plurality of mobile stations 201 is kept deenergized, that is, turns off its power switch. The mobile station 201(A) can detect the call by ringing of the bells of other mobile stations, i.e., the mobile station 201(B) and the like. Since the base station 1 and other mobile stations such as the station 201(B) are switched to a communication channel, the mobile station 201(A) cannot be connected to the base station 1. Therefore, the mobile station 201(A) cannot participate in communication in response to the call from the telephone exchanger 3.

SUMMARY OF THE INVENTION

It is an object of the present invention to eliminate the conventional drawbacks described above and to provide a radio telephone system, wherein a base station can detect a calling signal from a mobile station, which is generated any time in a stand-by mode.

In order to achieve the above object of the present invention, there is provided a radio telephone system including a base station connected to a telephone exchanger and a plurality of mobile stations connected to the base station through a radio channel having a control channel and a predetermined number of communication channels, wherein said base station comprises: a transmitter/receiver for transmitting/receiving a control signal through the control channel in a first mode and a communication signal through the communication channel in a second mode; a receiver for receiving a communication signal through a communication channel to detect a vacant one of the predetermined number of communication channels and for receiving the control signal through the control channel to monitor a calling signal transmitted from a given one of the mobile stations through the control channel; and a controller for performing both connection control and communication control through the radio channel by controlling the transmitter/receiver and the receiver, such that, in a first mode, the receiver receives the communication signal to detect a vacant communication channel and the transmitter/receiver receives the control signal to monitor a calling signal transmitted and, in a second mode, the receiver receives the control signal to monitor a calling signal while the transmitter/receiver is busy communication with the mobile station through the control channel.

According to the above-described structure of the radio telephone system a call from any mobile station any time can be immediately detected.

BRIEF DESCRIPTION OF THE DRAWINGS

FIGS. 2, 3, 3A and 3B are flow charts for explaining the operation of the conventional radio telephone system shown in FIG. 1;

FIGS. 5, 6A, 6B, and 6C are flow charts for explaining the operation of the radio telephone system shown in FIG. 4.

DETAILED DESCRIPTION OF THE PREFERRED EMBODIMENT

Figure 1:
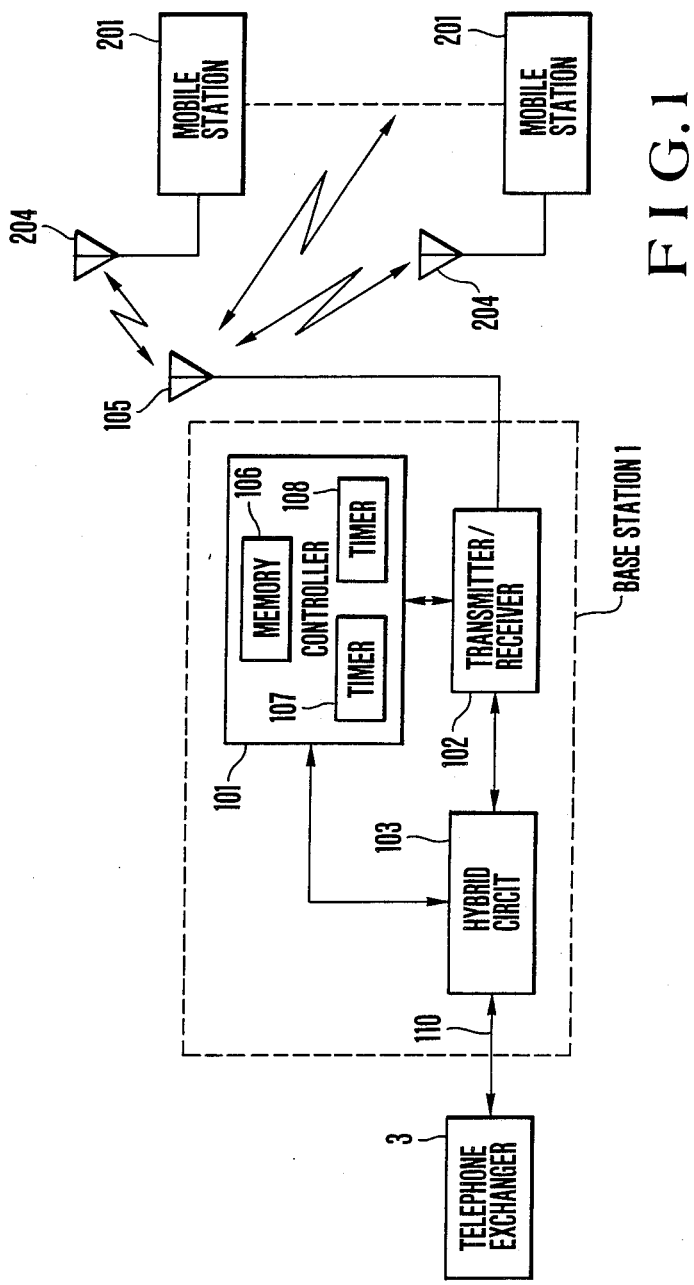
FIG. 1 is a block diagram of a conventional radio telephone system.
Figure 2:
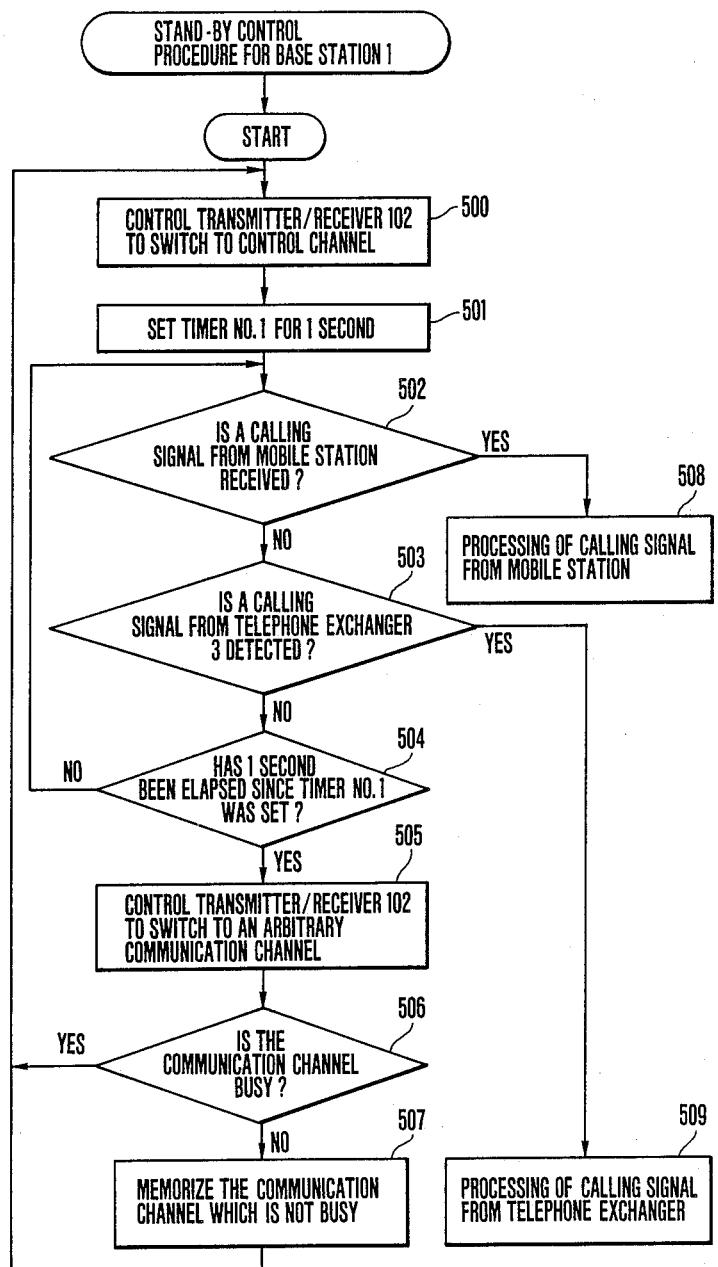
Figure 3B:
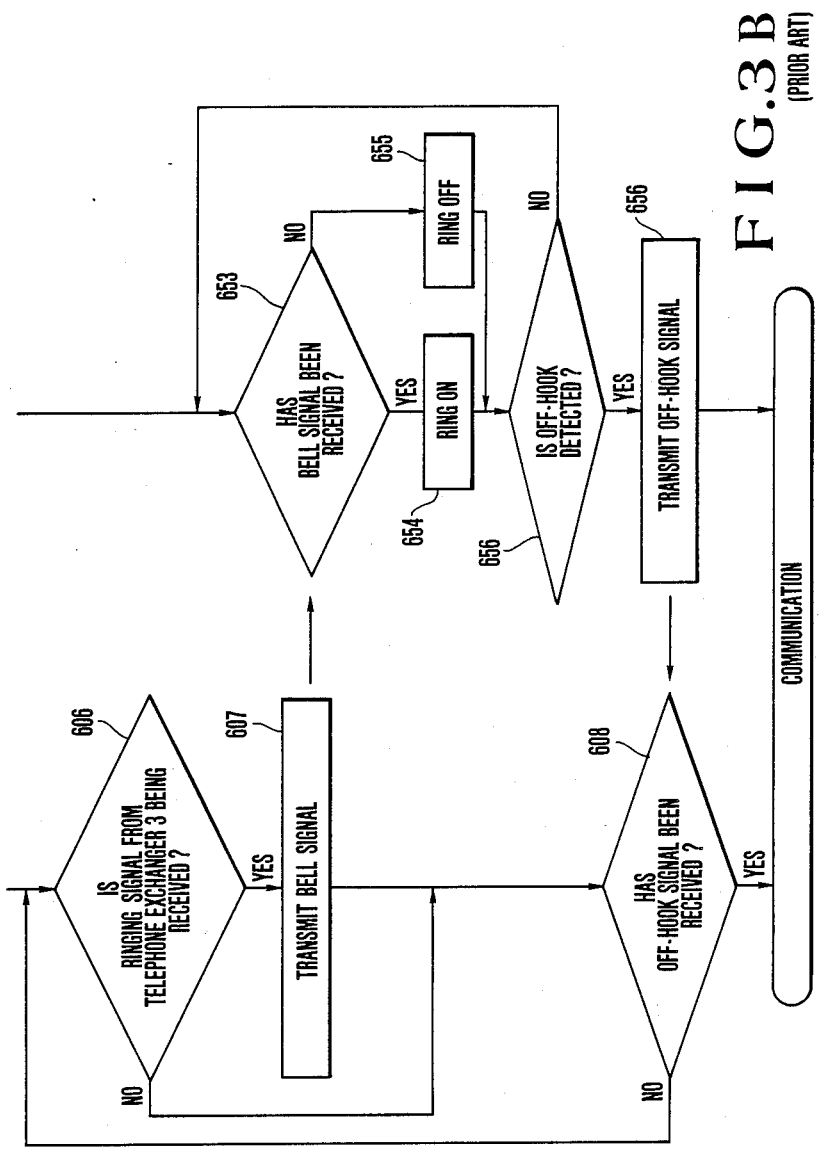
Figure 4:
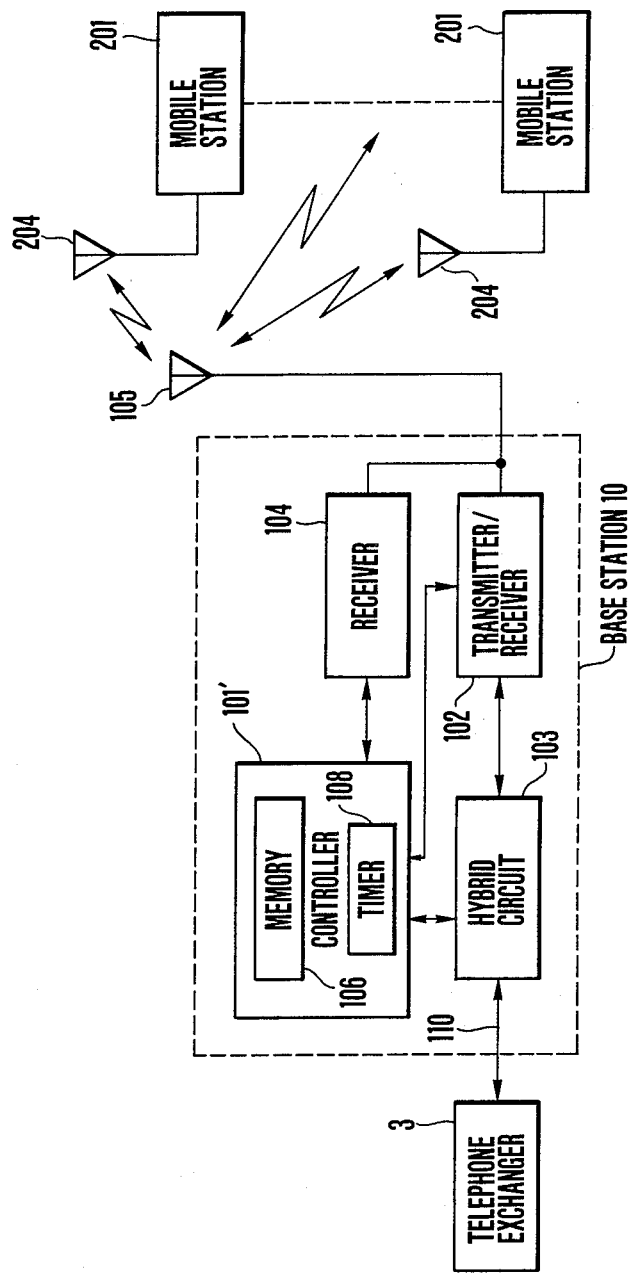
FIG. 4 is a block diagram of a radio telephone system according to an embodiment of the present invention.

A preferred embodiment of the present invention will be described in detail with reference to the accompanying drawings. FIG. 4 shows the overall arrangement of the radio telephone system according to an embodiment of the present invention. The same reference numerals as in FIG. 1 denote the same parts in FIG. 4. A radio telephone system shown in FIG. 4 comprises a base station 10 connected to a telephone exchanger 3 through a subscriber line 110 and a plurality of mobile stations 201 connected to the base station 10 through a radio channel.

The base station 10 comprises a controller 101' having a microprocessor as a main circuit component, a transmitter/receiver 102 for exchanging signals with the mobile station 201 through an antenna 105 and the radio channel, a receiver 104 for receiving a signal from the antenna 105, and a hybrid circuit 103.

The receiver 104 receives a communication signal through a communication channel to monitor a vacant one of a predetermined number of communication channels arranged in the radio channel and receives a control signal through a control channel to monitor a calling signal transmitted from the mobile station 201 through the control channel.

The controller 101' incorporates a memory 106 for storing data concerning vacant communication channel and a timer 108. In the stand-by mode, the controller 101' controls to cause the receiver 104 to monitor and search for the vacant communication channels and to cause the transmitter/receiver 102 to detect a control signal transmitted through the control channel. In a communication mode in which the transmitter/receiver 102 is communicating with the mobile station 201, the controller 101 causes the receiver 104 to receive the control channel to monitor the calling signal.

The operation of the radio telephone system shown in FIG. 4 will now be described.

Figure 6A:
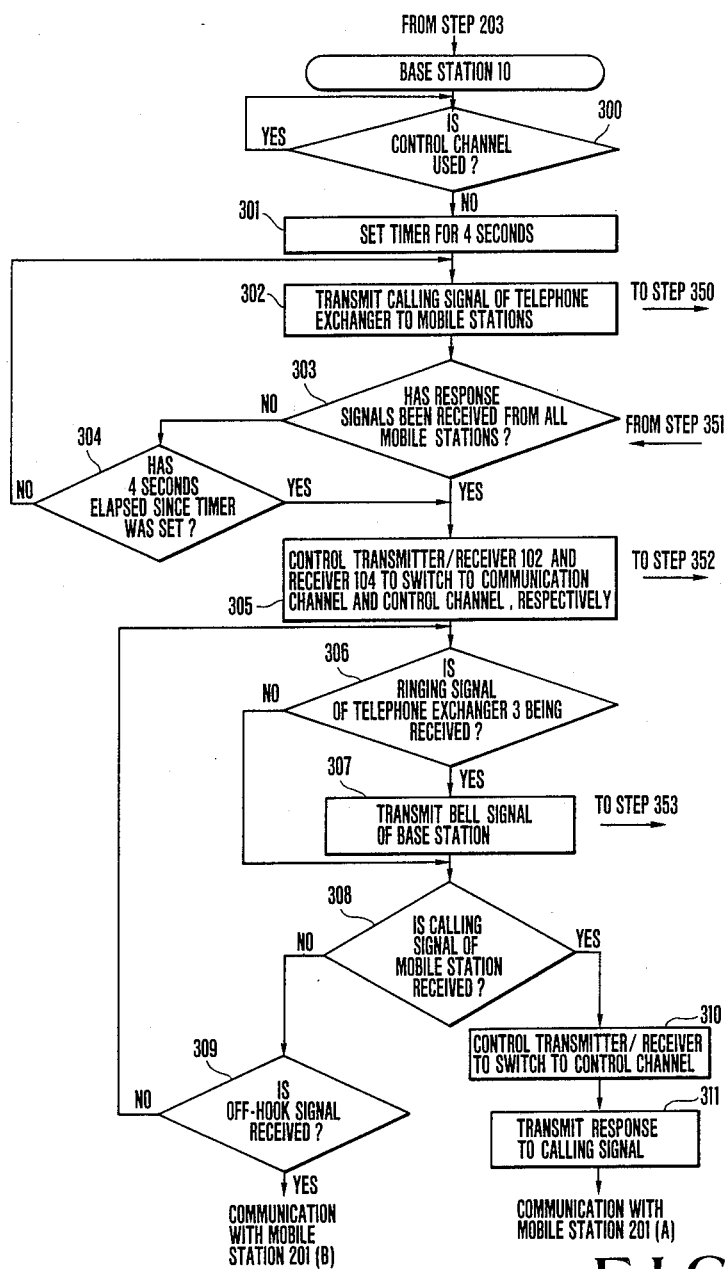
Figures 6B, 6C:
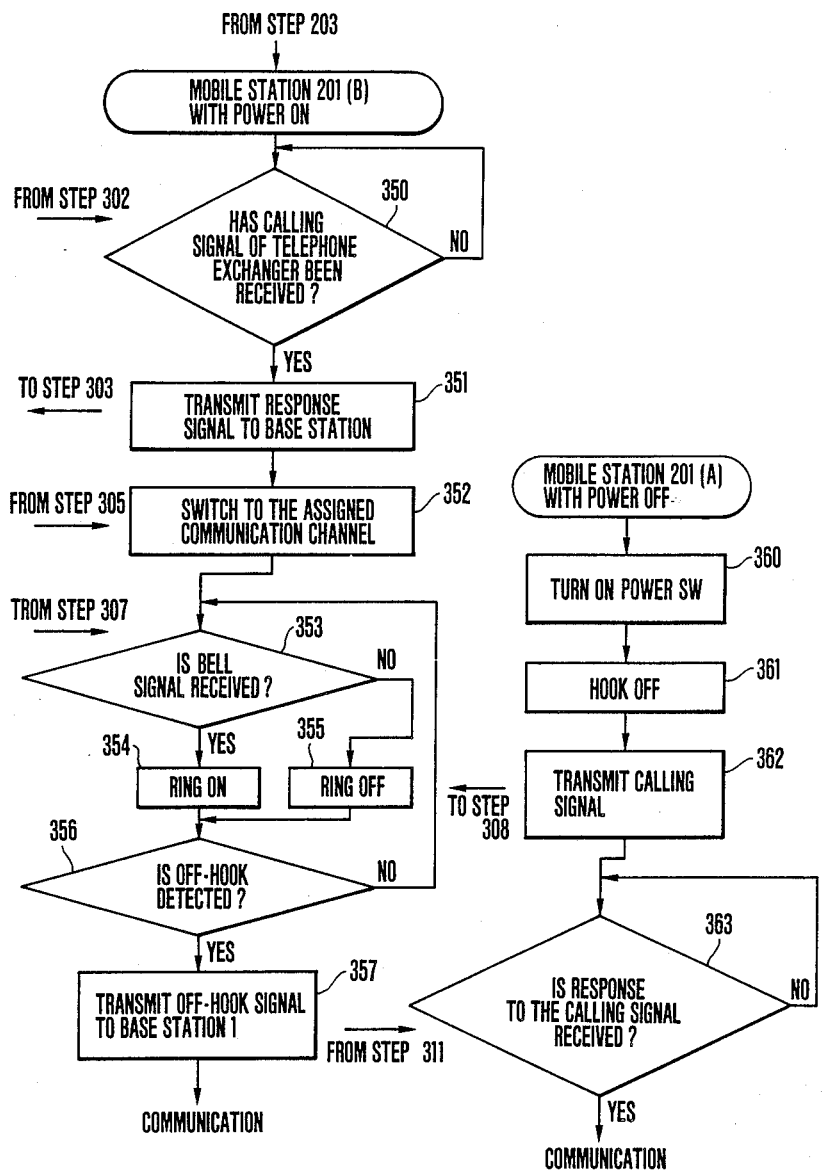

FIG. 5 is a flow chart for explaining the stand-by operation of the base station 10, FIG. 6A is a flow chart for explaining the calling connection operation of the base station 10, FIG. 6B is a flow chart for explaining the calling connection operation of a mobile station with power ON or an ON mobile station, and FIG. 6C is a flow chart for explaining a calling connection operation of a mobile station with power OFF or an OFF mobile station.

Referring to FIG. 5, the base station 10 is set in the stand-by mode upon its energization. In this state, the controller 101' switches the channel of the transmitter/receiver 102 to the control channel and the channel of the receiver 104 to a given communication channel (step 200), and the flow advances to step 201.

In step 201, the controller 101' determines whether at least one mobile station 201 transmits the calling signal from the mobile station. If YES in step 201, the flow advances to step 202. In step 202, processing of the calling signal from the mobile station is performed. However, if NO in step 201, the flow advances to step 203. A detailed description of processing of the calling signal from the mobile station will be omitted.

The controller 101' determines in step 203 whether the calling signal from the telephone exchanger 3, is detected. If YES in step 203, the flow advances to step 204. In step 204, processing of the calling signal from the telephone exchanger 3 is performed. This processing will be described in detail later. However, if NO in step 203, the flow advances to step 205.

The controller 101' determines in step 205 whether an arbitrarily selected communication channel is busy.

If YES in step 205, the flow returns to step 200. However, if NO in step 205, the flow advances to step 206.

In step 206, the vacant communication channel is memorized in the memory 106, and the flow returns to step 200. The controller 101' is then set in the stand-by mode.

It should be noted that the reception operation of the transmitter/receiver 102 and the reception operation of the receiver 104 are simultaneously performed. Therefore, even during the vacant communication channel detection by repeating reception of the calling signals in units of the communication channels, processing of the calling signal from the mobile station (step 202) can be performed if a calling signal from any mobile station 201 is detected.

As shown in FIG. 6A, in the base station 1 which detects the calling signal from the telephone exchanger 3 on the basis of an output state of the hybrid circuit 103, the controller 101' determines in step 300 whether the control channel is not used. If NO in step 300, the controller 101' sets the timer 108 for 4 seconds in step 301. The base station 10 transmits the calling signal to all mobile stations 201 in step 302. The controller 101' waits for responses from the mobile stations until 4 seconds set in the timer 108 have elapsed (steps 303 and 304). As shown in FIG. 6B, when the calling signal is received by the mobile stations 201 excluding the OFF mobile station 201(A) (step 350), the responses are transmitted from the ON mobile stations 201 to the base station 1 (step 351).

When the base station 10 receives the responses from the ON mobile stations 201 in step 303, or when four seconds set in the timer 108 have elapsed in step 304, the channels are switched from the control channel to a given communication channel in the transmitter/receiver 102 and from the communication channel to the control channel in the receiver 104, respectively. In this case, a communication channel assignment signal is transmitted from the base station 10 to the mobile stations 201 which have responded to the calling signal, and, therefore, the channel of each mobile station 201 is switched to the assigned communication channel (step 352).

The base station 10 receives a ringing signal as a 16-Hz intermittent signal from the telephone exchanger 3 and transmits the bell signal to the mobile stations 201 through the assigned communication channel in response to the ringing signal while the ringing signal is "ON" (steps 306 and 307). The base station 10, i.e., the controller 101' waits for the calling signal from the mobile station through the control channel (step 308) and the off-hook signal through a communication channel (step 309).

The ON mobile station, e.g., 201(B) and the OFF mobile station, e.g., 201(A) are operated according to difference sequences, as shown in FIGS. 6B and 6C, respectively.

When the ON mobile station 201(B) receives the bell signal, the bell rings intermittently (steps 353 to 355) to cause the user to off-hook the radio mobile telephone set. When off-hook is detected in step 356, the ON mobile station 201(B) transmits the off-hook signal to the base station 10 in step 357. The base station 10 receives the off-hook signal (step 309 in FIG. 6A). Therefore, the communication signal is exchanged between the base station 1 and the mobile station 201(B). The above operations are the same as those of the conventional radio telephone system.

The following operations are the characteristic features of the present invention. When the user judges that it is convenient for him or her to use the OFF mobile station 201(A) after he or she has heard ringing of the ON mobile station 201(B) in steps 353 to 355, the user can turn on the power switch of the mobile station 201(A) (step 360) and off-hooks (step 361). As a result, the mobile station 201(A) transmits the calling signal through the control channel (step 362) and waits for a response to the calling signal in step 363. The receiver 104 of the base station 10 receives this calling signal. In this case, the base station 10 receives the calling signal from the mobile station 201(A) (step 308) instead of the off-hook signal (step 309). The controller 101' switches the channel of the transmitter 102 from the communication channel to the control channel in step 310. Thereafter, the same procedures as in the conventional techniques are performed. The communication channel of the radio channel is set between the base station 10 and the mobile station 201(A), and communication is allowed.

According to the radio telephone system as described above, the receiver 104 is arranged in the base station 10 in addition to the transmitter/receiver 102 to detect a vacant one of the predetermined number of communication channels and to monitor the calling signal from the mobile station by using the control channel. In the stand-by mode, an arbitrary call made any time at any mobile station 201 can be immediately detected. A radio channel can be formed between the base station 10 and this mobile station 201. In this case, unlike in the conventional system wherein the base station waits for the calling signal by alternately switching the control and the communication channels, stand-by control can be simplified. The radio channel can be formed between the base station 10 and the mobile station 201 while the base station 10 waits for the off-hook signal from the mobile station 201 in response to the calling signal from the telephone exchanger 3. Since even an OFF mobile station (201(A)) can be used for communication after the user hears ringing of other mobile stations (201(B), etc.) and the OFF mobile station 201(A) is powered, the radio telephone system according to the present invention is very convenient.

What is claimed is:

1. A multi-access radio telephone system having
   a base station connected to a telephone exchanger and
   a plurality of mobile stations connected to said base station through radio channels including a control channel and a predetermined number of communication channels,
   said base station comprising:
   a transmitter/receiver for receiving a control signal through said control channel and for transmitting/receiving a communication signal through a given one of the predetermined number of communication channels;

a receiver for receiving a communication signal through a given one of the predetermined number of communication channels to detect a vacant one of the predetermined number of communication channels and for receiving the control signal to monitor a calling signal received from a given one of said plurality of mobile stations through the control channel, respectively; and control means for performing connection control and communication control such that, in a first mode, said receiver receives the communications signal to detect a vacant communication channel while said transmitter/receiver receives the control signal to monitor the calling signal transmitted from said given mobile station through the control channel, and in a second mode, said receiver receives the control signal to monitor a calling signal while said transmitter/receiver is busy communicating with said mobile station.

2. A system according to claim 1, wherein said control means comprises a memory for storing vacant communication channel data.

3. A system according to claim 1, wherein when said base station is set in the first mode and receives a calling signal from said telephone exchanger, said control means in said base station transmits a calling signal from said telephone exchanger from said transmitter/receiver to all of said plurality of mobile stations through the control channel, receives responses from at least one of said plurality of mobile stations, when a predetermined period of time has elapsed, switches a channel of said transmitter/receiver to a given one of said communication channels and a channel of said receiver to the control channel, assigns one of said predetermined number of communication channels to responding ones of said plurality of mobile stations, establishes communication between said base station and said responding mobile stations, causes said receiver to monitor a calling signal from a nonresponding one of said plurality of mobile stations, and switches the channel of said transmitter/receiver to the control channel when said control means receives the calling signal from said nonresponding mobile station, thereby controlling to establish communication between said nonresponding mobile station and said telephone exchanger.

4. A system according to claim 3, wherein said control means comprises a timer in which the predetermined period of time is set.

5. A radio telephone system comprising connector means connected to a telephone exchanger and a plurality of radio telephone sets connected to said connector means through radio channels including a control channel and a predetermined number of communication channels, said connector means comprising:

a transmitter/receiver for transmitting/receiving a control signal through a given one of the communication channels;

a receiver for receiving the control signal through said control channel and a communication signal through a given one of the communication channels; and control means, including a memory and a timer, for controlling said transmitter/receiver and said receiver to perform connection control and communication control through said radio channel, wherein said control means sets a channel of said transmitter/receiver to said control channel to allow processing a calling signal from a given one of the plurality of mobile stations and a channel of said receiver to a given one of the communication channels to allow monitoring of communication channels, causes said memory to store a vacant communication channel, waits for calling signal from said radio telephone set or said telephone exchanger, sets a predetermined period of time in said timer when the calling signal from said telephone exchanger is received, transmits the calling signal from said telephone exchanger to all of said plurality of radio telephone sets, receives responses from at least one of said plurality of telephone sets, switches the channel of said transmitter/receiver to given one of said communication channels and the channel of said receiver to said control channel when the predetermined period of time set in said timer has elapsed, transmits to said plurality of radio telephone sets a ringing signal to establish communication between a first off-hooked one of said plurality of telephone sets and said telephone exchanger, and switches the channel of said transmitter/receiver to said control channel when said receiver receives a calling signal from a second one of said plurality of radio telephone sets which did not respond within the predetermined period of time, thereby establishing communication between said second radio telephone set and said telephone exchanger.

* * * * *

UNITED STATES PATENT AND TRADEMARK OFFICE
CERTIFICATE OF CORRECTION

PATENT NO. : 4,875,231
DATED : October 17, 1989
INVENTOR(S) : Hara et al

It is certified that error appears in the above-identified patent and that said Letters Patent is hereby corrected as shown below:

Column 4, line 44, delete "1o1" and insert --101'--.

Signed and Sealed this

Twenty-second Day of January, 1991

Attest:

HARRY F. MANBECK, JR.

Attesting Officer

Commissioner of Patents and Trademarks